(12) United States Patent
Nammensma et al.

(10) Patent No.: US 7,851,104 B2
(45) Date of Patent: Dec. 14, 2010

(54) ANODE-SUPPORTED FUEL CELL

(75) Inventors: Pieter Nammensma, Heerhugowaard (NL); Robert De Rooy, Egmond Aan Zee (NL); Bartholomeus Cornelis Broersen, Warmenhuizen (NL)

(73) Assignee: H. C. Starck GmbH, Goslar (DE)

( * ) Notice: Subject to any disclaimer, the term of this patent is extended or adjusted under 35 U.S.C. 154(b) by 1358 days.

(21) Appl. No.: 10/520,117

(22) PCT Filed: Jul. 3, 2003

(86) PCT No.: PCT/NL03/00492

§ 371 (c)(1),
(2), (4) Date: Sep. 23, 2005

(87) PCT Pub. No.: WO2004/006365

PCT Pub. Date: Jan. 15, 2004

(65) Prior Publication Data

US 2006/0093887 A1  May 4, 2006

(30) Foreign Application Priority Data

Jul. 3, 2002  (NL) .................................. 1020985

(51) Int. Cl.
*H01M 8/02* (2006.01)
*H01M 8/12* (2006.01)
*H01M 4/86* (2006.01)

(52) U.S. Cl. ...................... 429/508; 429/456; 429/517; 429/519; 429/522; 429/532

(58) Field of Classification Search .................. None
See application file for complete search history.

(56) References Cited

U.S. PATENT DOCUMENTS

| | | | | |
|---|---|---|---|---|
| 6,265,095 B1 * | 7/2001 | Hartvigsen et al. | ............ | 429/32 |
| 6,492,053 B1 * | 12/2002 | Donelson et al. | ............... | 429/34 |
| 2004/0081878 A1 * | 4/2004 | Mardilovich et al. | ........... | 429/34 |
| 2004/0121222 A1 * | 6/2004 | Sarkar et al. | ................... | 429/45 |

FOREIGN PATENT DOCUMENTS

| | | |
|---|---|---|
| DE | 196 26 342 | 1/1998 |
| EP | 0 454 924 | 11/1991 |
| EP | 0 788 175 | 8/1997 |
| WO | WO 01 43524 | 6/2001 |

* cited by examiner

*Primary Examiner*—Jonathan Crepeau
*Assistant Examiner*—Tony Chuo
(74) *Attorney, Agent, or Firm*—Young & Thompson

(57) ABSTRACT

Anode-supported fuel cell, in particular SOFC, where stresses in the anode substrate are compensated for by a stress compensation layer. According to the invention said stress compensation layer is made porous by making a large number of vary small openings. These openings are preferably made hexagonal and the thickness of the walls between the openings is minor. An electron-conducting porous layer is applied to the stress compensation layer.

9 Claims, 1 Drawing Sheet

ANODE-SUPPORTED FUEL CELL

BACKGROUND OF THE INVENTION

The present invention relates to an anode-supported fuel cell comprising an anode support, an anode layer, an electrolyte layer and a cathode layer, said anode support being provided with a stress compensation layer on the side opposite the anode layer.

DESCRIPTION OF THE RELATED ART

A fuel cell of this type is disclosed in WO 01/43524. Such a fuel cell consists of layers of different materials with different coefficients of expansion. During the appreciable changes in temperature in the cell, as well as the changes in volume as a result of the chemical reactions that take place in the anode substrate, there is a risk that the latter warps. This makes the production of a cell stack particularly difficult; the deformability and the mechanical strength of such a cell are so low that "lurging" straight inevitably leads to fracture.

To avoid this problem, which arises mainly during the first sintering of the anode support, it is proposed in WO 01/43524 to apply a stress compensation layer. This stress compensation layer is on the side of the anode support that is opposite the side of the anode support where the anode is applied. By making the mechanical and shrink characteristics thereof essentially the same as those of the electrolyte layer it is possible largely to prevent warping.

However, it is important that the process in the fuel cell can take place without hindrance. That is to say that it must be possible for transport of both gases and electrons to be able to take place without hindrance.

To this end it is proposed in the abovementioned PCT application to make relatively large openings in the stress compensation layer through which gases are able to move. The openings also serve as contact pressure points for a current collector. Transport of gases must take place through these openings. There is a relatively large distance between the openings which is varied depending on the position with respect to the point at which the gases are introduced. This part of the stress compensation layer is permeable to gas.

This means that stringent requirements are imposed with regard to the accurate positioning of the stress compensation layer with respect to the other parts of the fuel cell and more particularly the current collector. In view of the inaccuracy this means that the holes in the stress compensation layer through which the current collector extends have to be made relatively large.

The method for the production of such a stress compensation layer is complex. It is proposed, starting from the anode support, to mask certain regions thereon and then to apply the stress compensation layer in some way or other and then to sinter the assembly.

As a result of the large distance between the holes there is the disadvantage that a uniform distribution of gases, ions and electrons at the location of the anode can no longer be ensured. This applies in particular if the supporting substrate is relatively thin. The aim is for relatively thin components in order to reduce the costs of the materials for such a cell as far as possible.

SUMMARY OF THE INVENTION

The aim of the present invention is to avoid the disadvantages described above and to provide an anode-supported fuel cell with which, on the one hand, the problem indicated above and possible warping of the anode support are prevented and which, on the other hand, can be produced in a simple manner and guarantees a more uniform distribution of ions and electrons.

This aim is realized with an anode-supported fuel cell as described above in that said stress compensation layer is a porous layer extending without essential interruptions and a porous layer with a thickness of at most 100 µm that is electron-conducting in the operational state is applied to said stress compensation layer on the side away from the anode support.

According to the present invention there are no longer relatively large holes in the stress compensation layer but this layer extends continuously. The stress compensation layer is provided with a large number of relatively small openings that preferably have a maximum diameter of 1 mm. More particularly, the diameter (converted to relate to a circular opening) is approximately 0.4 mm. Such relatively small openings can have any conceivable shapes, but according to an advantageous embodiment of the invention are made hexagonal. The distance between the openings is restricted so that the effect of non-uniform distribution described above, especially in the case of thin layers, does not arise. In particular, the distance between adjacent openings, that is to say the "wall thickness" between the openings is less than 1 mm and more particularly approximately 0.3-0.5 mm and according to a particularly preferred embodiment approximately 0.4 mm. Surprisingly, it has been found that when a stress compensation layer of such a construction is used warping of the fuel cell can be prevented. With the stress compensation layer according to the invention it is possible to keep the distance that the gas travels to the electrolyte as small as possible. This distance is preferably less than 800 µm.

The stress compensation layer is preferably a zirconium oxide layer.

By applying a further electron-conducting porous layer to the stress compensation layer it is no longer necessary for the actual current collector to be directly in contact with the stress compensation layer or the anode. Such a porous electron-conducting layer, which functions as auxiliary current collector, is preferably a nickel/nickel oxide layer of relatively small thickness of at most 100 µm and more particularly approximately 50 µm at the time of application. This results in a layer thickness of approximately 10-20 µm (nickel) after sintering and reduction. As a result of the application of such a further electron-conducting layer the number of contact points through the stress compensation layer can be appreciably increased. The pore sizes of such a porous layer are preferably between 0.2-0.6 µm and more particularly are approximately 0.4 µm.

The various components from which the fuel cell is made up can be all components known in the state of the art. The same applies with regard to the method of production of the fuel cell. In general, the anode (including support and electrolyte) will first be sintered at a relatively high temperature, after which the cathode is applied and sintering then takes place at a somewhat lower temperature. However, it is also possible to produce the fuel cell or electrochemical cell according to the invention in a larger number of steps or smaller number of steps. When producing the electrochemical cell in the manner described above, after providing the anode support and applying the anode layer, optional auxiliary layer and electrolyte thereto, the stress compensation layer is applied to the other side of the anode substrate. According to the present invention, this application takes place by means of a printing technique and more particularly by means of a screen printing technique. By this means it is possible to make a very regularly distributed pattern of very small openings with the very small layer thicknesses. Moreover, such a screen printing technique is particularly simple to carry out and it is no longer necessary for certain parts of the anode substrate to be masked and the like. After applying the stress compensation layer using some printing technique or other, the nickel oxide layer or other layer that is porous and electron-conducting after sintering is then applied. The assembly described above can then be sintered at a temperature of approximately 1400° C. Of course, it is also possible, starting from the anode support, to vary the sequence of the application of the various layers to some extent.

The shape of the small openings in the stress compensation layer that can be obtained by means of screen printing can be any shape known the state of the art. Preferably, the various features are produced in a regular honeycomb pattern.

It has been found that with a cell as described above the problem of warping of the anode support can be solved, whilst, on the other hand, with a simple production method combination of the cell components can easily be achieved and uniform distribution of gases, electrons and ions over the anode support is guaranteed.

BRIEF DESCRIPTION OF THE DRAWINGS

The invention will be explained in more detail below with reference to an illustrative embodiment shown in the drawing. In the drawing.

DESCRIPTION OF THE PREFERRED EMBODIMENTS

Figure 1:
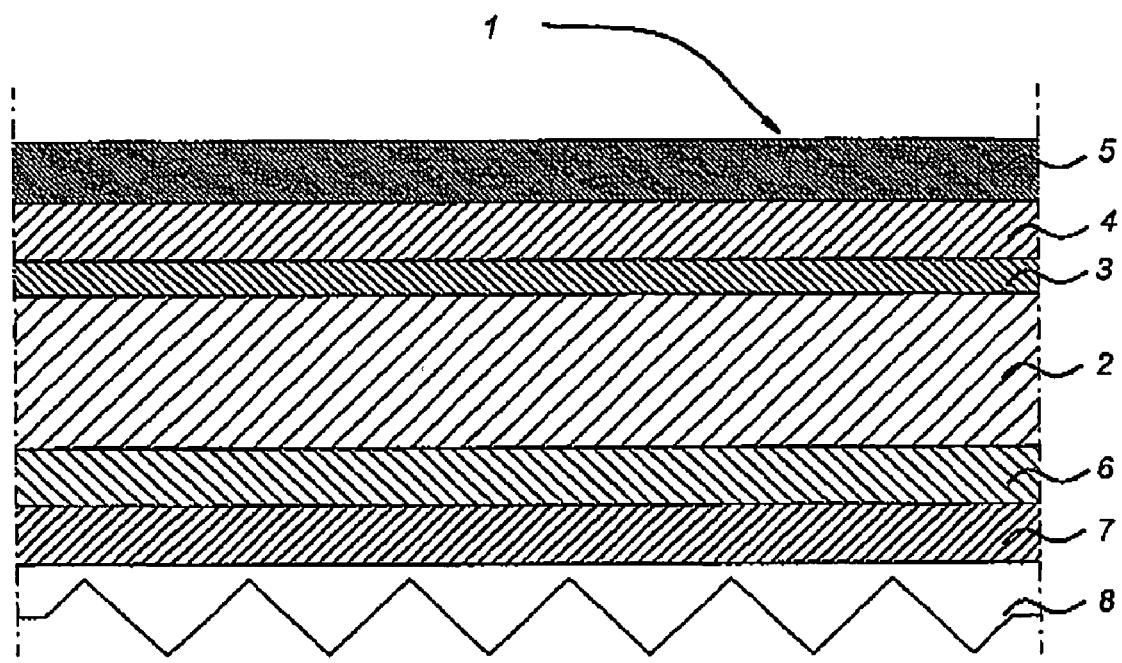
FIG. 1 shows, diagrammatically in cross-section, the various layers of the anode-supported fuel cell according to the invention.

In FIG. 1 the fuel cell according to the present invention is shown by 1. This fuel cell is indicated in its entirely by 1 and consists of an anode support 2. This anode substrate can be made of any material known in the state of the art, such as porous NiO/YSZ.

The actual anode (auxiliary) layer 3 is applied thereto. Of course, this layer 3 can be omitted. An electrolyte layer is indicated by 4. The cathode, which is indicated by 5, is applied thereto. This is merely diagrammatic and this cathode can consist of a larger number of layers.

The anode support 2 is provided on the other side with a stress compensation layer 6. This is made without large openings and applied to anode support 2, for example by screen printing. Very small openings with a diameter (based on a circle) of 1 mm or less are made during screen printing. This stress compensation layer preferably consists of a material having thermal and mechanical properties corresponding to those of the material of layer 4. That is to say, if stresses arise between substrate 2 and layer 4 during heating or cooling or during chemical reactions precisely the same stresses will arise between substrate 2 and layer 6, as a result of which warping of said substrate is prevented.

A porous electron-conducting layer 7, such as a layer of nickel oxide which on sintering and reduction is converted to porous nickel is applied to layer 6. The thickness of such a layer is less than 100 μm, preferably approximately 50 μm, at the time of application, so that a layer thickness of 10-20 μm results on sintering.

The porosity of layer 6 is preferably 40%.

Of course, components or various components taken together which have special properties that are produced during the production of the fuel cell described above also fall within the scope of the present invention. That is to say, rights are requested for an assembly consisting of an anode-supported cell provided with a stress compensation layer according to the invention, in combination with the electron-conducting layer applied thereto, both in the green and in the sintered state.

A current collector 8, indicated highly diagrammatically, presses against layer 7.

Figure 2:
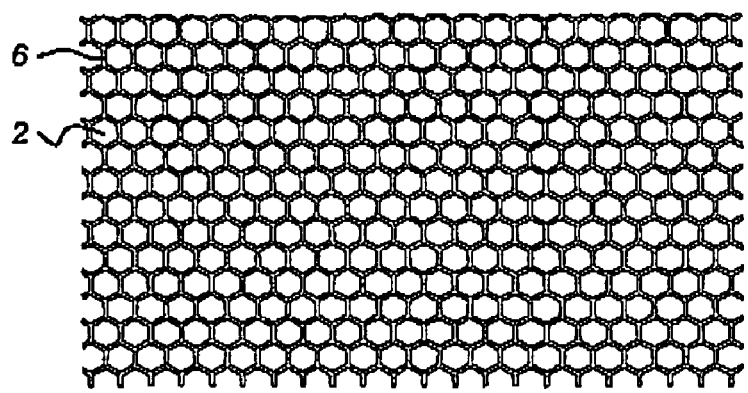
FIG. 2 shows a plan view of the stress-compensating layer immediately after this has been applied to the anode substrate.

FIG. 2 shows a plan view of layer 6 after application to layer 2 by screen printing. The very regular hexagonal pattern of the openings extending through layer 6 which link substrate 2 and layer 7 can clearly be seen from this figure.

Although the invention has been described above with reference to a preferred embodiment, it will be understood that numerous modifications can be made thereto without going beyond the scope of the present invention as described in the claims.

The invention claimed is:

1. Anode-supported fuel cell, comprising:
   an anode support,
   an anode layer on a first side of the anode support,
   an electrolyte layer,
   a cathode layer, and
   a stress compensation layer provided on a second side of the anode support opposite the anode layer,
   said stress compensation layer being comprised of i) a first porous layer extending without essential interruptions and having a porosity of at most 40% and ii) a second porous layer with an unsintered thickness of at most 100 μm that is electron-conducting in the operational state applied to said first porous layer on the side away from the anode support.

2. Fuel cell according to claim 1, wherein the second porous layer has a thickness of 10-20 μm in the operational state.

3. Fuel cell according to claim 1, wherein said second porous layer comprises an unsintered nickel/nickel oxide layer.

4. Fuel cell according to claim 1, wherein the first porous layer is provided with a regular pattern of holes having an internal opening of at most 1 mm.

5. Fuel cell according to claim 4, wherein said holes are hexagonal.

6. Anode-supported fuel cell, comprising:
   an anode support;
   an anode layer in contact with a first side of said anode support;
   an electrolyte layer in contact with said anode layer;
   a cathode layer in contact with said electrolyte layer; and
   a stress compensation layer in contact with a second side of said anode support on a side opposite the anode layer, wherein,
   said stress compensation layer is comprised of a first porous layer extending without essential interruptions and in contact with the second side of said anode support, the first porous layer having a porosity of at most 40%, and a second porous layer with a sintered thickness of 10 to 20 μm, the second porous layer being electron-conducting in the operational state.

7. Fuel cell according to claim 6, wherein said second porous layer comprises an nickel layer.

8. Fuel cell according to claim 6, wherein the first porous layer is provided with a regular pattern of holes having an internal opening of at most 1 mm.

9. Fuel cell according to claim 8, wherein said holes are hexagonal.

* * * * *